United States Patent [19]
Gorin et al.

[11] 3,937,787
[45] Feb. 10, 1976

[54] TREATMENT OF GASES CONTAINING SULFUR DIOXIDE

[75] Inventors: Everett Gorin; Metro D. Kulik; Robert T. Struck, all of Pittsburgh, Pa.

[73] Assignee: Continental Oil Company, Ponca City, Okla.

[22] Filed: May 9, 1973

[21] Appl. No.: 358,786

Related U.S. Application Data

[63] Continuation-in-part of Ser. Nos. 222,760, Feb. 2, 1972, abandoned, and Ser. No. 309,869, Nov. 27, 1972, abandoned, and Ser. No. 347,261, April 2, 1973, abandoned.

[52] U.S. Cl. ............................................. 423/242
[51] Int. Cl.² ....................................... C01B 17/00
[58] Field of Search ........................... 423/242–244

[56] References Cited
UNITED STATES PATENTS

| | | | |
|---|---|---|---|
| 1,937,196 | 11/1933 | Gollmar | 423/242 |
| 2,729,543 | 1/1956 | Keller | 423/242 |
| 3,574,097 | 4/1971 | Urban | 423/242 |
| 3,728,433 | 4/1973 | Urban | 423/243 |

*Primary Examiner*—Oscar R. Vertiz
*Assistant Examiner*—Gregory A. Heller
*Attorney, Agent, or Firm*—William A. Mikesell, Jr.; D. Leigh Fowler, Jr.; Stanley J. Price, Jr.

[57] ABSTRACT

An improvement in regenerative $SO_2$ scrubbing systems which use sodium, potassium or ammonium carbonate to react with the $SO_2$ to form sulfite, wherein a thiosulfate-rich aqueous solution of the carbonate is used to prevent oxidation of the sulfite to sulfate; to serve both as a source of the carbonate and as a source of sulfite-reducing agent; and finally to increase the salt concentration in the $SO_2$ absorbent solution, to thereby permit operation of the scrubbing system at higher temperatures than those normally employed.

11 Claims, 1 Drawing Figure

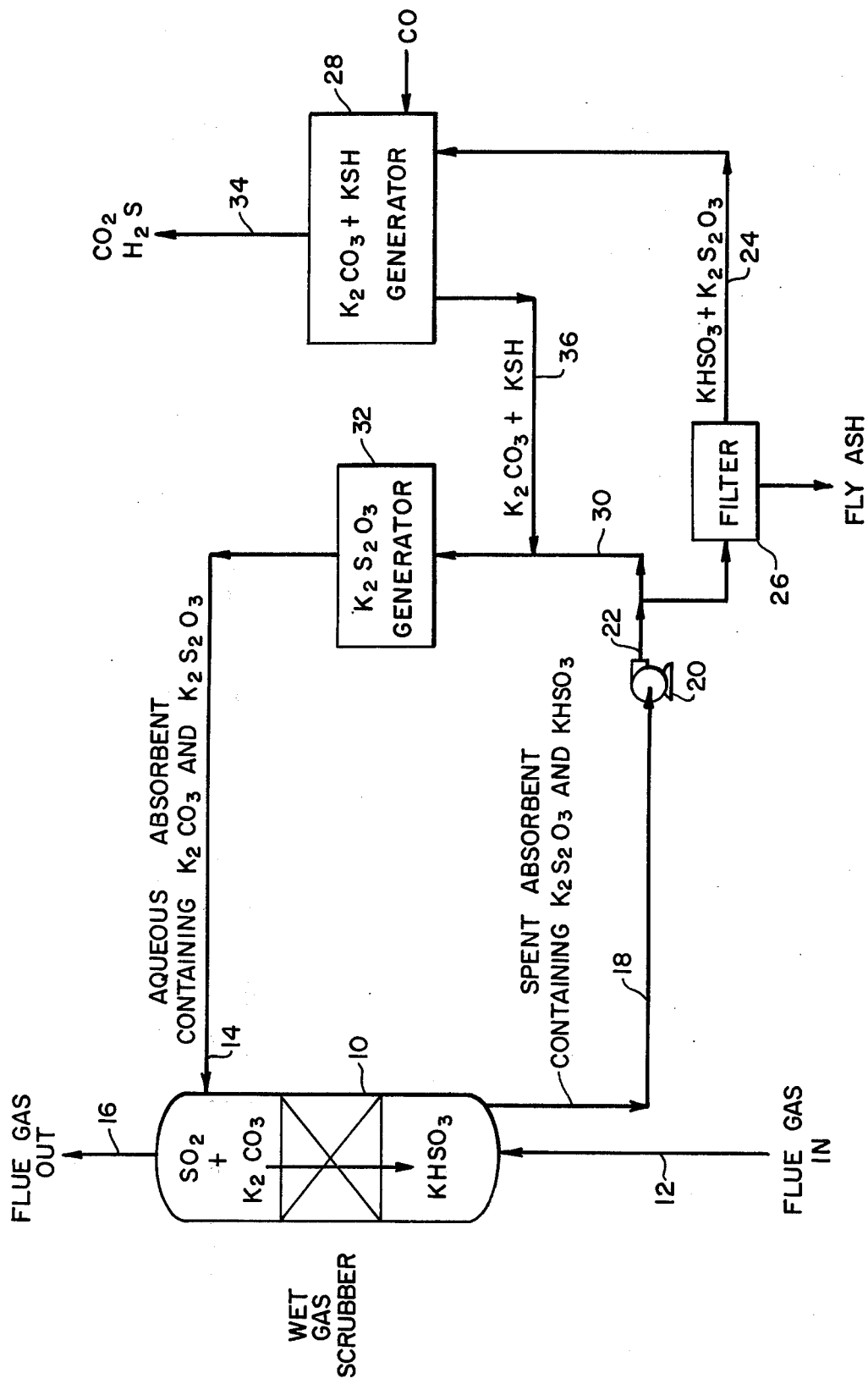

TREATMENT OF GASES CONTAINING SULFUR DIOXIDE

CROSS-REFERENCES TO RELATED APPLICATIONS

This application is a continuation-in-part of application Ser. No. 222,760, filed Feb. 2, 1972 and now abandoned; of application Ser. No. 309,869, filed Nov. 27, 1972 and now abandoned; and of application Ser. No. 347,261, filed Apr. 2, 1973 and now abandoned, all of which are assigned to the assignee of the present invention; and all are hereby incorporated by reference into the present application.

BACKGROUND OF THE INVENTION

1. Field of the Invention

The present invention relates generally to the treatment of gases containing sulfur dioxide, and more particularly, to an improvement in those processes for removal of sulfur dioxide from flue gases which use an aqueous absorbent containing sodium, potassium, or ammonium carbonate to convert the sulfur dioxide to sulfite. The term "sulfite" as used herein refers to both the sulfite and bisulfite form of the anion; and the term "carbonate" likewise refers to both the carbonate and bicarbonate form of the anion.

2. Description of the Prior Art

The art is extensive on the removal of $SO_2$ from gaseous mixtures by means of aqueous absorbents containing alkaline sulfite-forming additives. The sulfite-forming additives include sodium, potassium and ammonium carbonates. The absorption of $SO_2$ by suitable contact of an $SO_2$-containing gas phase with an aqueous solution containing such additives is both rapid and efficient, provided certain conditions are satisfied. Efficient absorption depends upon operating with scrubbing solutions which contain a low equilibrium vapor pressure of $SO_2$ over them. Such a condition is reached when the concentration of sulfite is relatively low, i.e. less than about five weight percent, and when the pH is relatively high, i.e. greater than 6.0.

Rapid absorption can be achieved, in general, by operating with scrubbers of proper design which provide adequate contact area between the liquid and the gas and in which turbulent flow conditions are maintained.

The state of the art of sulfur dioxide removal from industrial waste gases as of the year 1958 is presented by the Bureau of Mines (U.S. Department of the Interior) in its Information Circular 7836 entitled "Sulfur Dioxide — Its Chemistry and Removal from Industrial Waste Gases" by D. Bienstock, L. W. Brunn, E. M. Murphy and H. E. Benson.

The difficulties associated with the use of the above-cited absorbents in the treatment of flue gases particularly, include the following. Firstly, and perhaps most serious, is the formation of sulfates by oxidation of the sulfites formed in the scrubber. Presumably, such sulfates result from reaction of the oxygen contained in the flue gas with either sulfite or bisulfite or by disproportionation of the sulfite or bisulfite. In any case, the relatively insoluble sulfate builds up in any regenerative system, that is one where the additive is regenerated for reuse in the scrubber, thus creating operational difficulties as well as resulting in consumption of absorbent. To prevent such build-up, a portion of the absorbent must be discarded, thus causing a waste of useful absorbent. Secondly, the regeneration of the additive has always been a problem in terms of cost. Any regeneration procedure which is effective but cheaper than those now known will be an improvement. Thirdly and lastly, the concentration of the additive in aqueous absorbents of the foregoing type has generally been small. Yet, adequate contact between gas and additive requires a relatively large volume of aqueous absorbent. Such dilute aqueous solutions impose an undesirably low temperature of operation in the scrubber. Higher concentrations of salts in the aqueous absorbent result in lower water vapor pressure over the scrubbing solution and thus permit higher scrubbing temperatures; and hence less reheat is required before the scrubbed gas is released to the atmosphere.

The primary object of the present invention is to provide an improvement in the processes of the type described which alleviates these problems. Patents which may be considered pertinent to the improvement are as follows:

| | | |
|---|---|---|
| U. S. 1,795,121 | Hansen | Mar. 3, 1931 |
| U. S. 2,729,543 | Keller | Jan. 3, 1956 |
| U. S. 3,236,589 | Reinhall et al. | Feb. 22, 1966 |
| U. S. 3,431,070 | Keller | Mar. 4, 1969 |
| U. S. 3,523,755 | McRae | Aug. 11, 1970 |
| U. S. 3,574,097 | Urban | Apr. 6, 1971 |
| U. S. 3,644,087 | Urban | Feb. 22, 1972 |
| U. S. 3,710,548 | Coughlin | Jan. 16, 1973 |
| Br.Pat. 134,943 | | Nov. 17, 1919 |
| Br.Pat. 292,186 | | June 11, 1928 |
| Br.Pat. 459,418 | | Jan. 7, 1937 |
| German 208,633 | | May 16, 1908 |

SUMMARY OF THE INVENTION

The process of the present invention is an improvement in those aqueous regenerative processes for the removal of $SO_2$ from $SO_2$-containing gas streams which have (1) a scrubbing circuit containing a scrubbing zone through which a recirculating stream of aqueous sodium, potassium or ammonium carbonate solution continuously passes in intimate contact with the $SO_2$-containing gas stream under sulfite-forming conditions to thereby convert the $SO_2$ in gas stream to sulfite, and (2) a regeneration zone for regenerating the carbonate for reuse in the scrubbing zone.

The improvement comprises, in its broadest aspects, the following steps:

1. maintaining in the recirculating aqueous solution, throughout its entire traverse around the scrubbing circuit, a thiosulfate having the same cation as the carbonate and in a concentration of at least 10 percent by weight of the solution;

2. regulating the amount of sulfite in the recirculating aqueous solution so that its concentration is always less then 5 percent by weight thereof;

3. converting the sulfite formed in said scrubbing zone to thiosulfate while in the scrubbing circuit but in a sulfite-reduction zone separate from the scrubbing zone, by means of a sulfite-reducing agent;

4. withdrawing a minor portion of the recirculating aqueous solution from the scrubbing circuit to a regeneration zone wherein thiosulfate contained in the minor portion is converted by means of carbon monoxide to a mixture of carbonate and said sulfite-reducing agent; and 5. returning an effluent aqueous stream containing in admixture the carbonate and sulfite-reducing agent to said scrubbing circuit.

A brief general description will now be given of each step of our improvement. Step 1 requires the recirculating aqueous solution to contain an amount of thiosulfate in a concentration of at least 10 percent by weight of the solution. The maximum concentration is set by the solubility of the thiosulfate in the aqueous solution. The thiosulfate serves three separate and distinct purposes. Firstly, the thiosulfate serves as a source of carbonate and of sulfide at one and the same time. Secondly, the thiosulfate serves to greatly reduce the amount of sulfate formed by the reaction of sulfites and oxygen in the case of flue gases which normally contain unused oxygen in addition to $SO_2$. For such purpose, the concentration of thiosulfate is preferably at least 15 weight percent thereof (see our above-cited copending application, Ser. No. 309,869). Thirdly, the thiosulfate serves to provide an essentially inert solute in the aqueous scrubbing circuit that permits high salt concentrations whereby water vapor pressure over the scrubbing solution is decreased and higher temperatures of operation in the scrubbing zone may be achieved, that is in the range of about 120° to 180°F. For such purpose, a thiosulfate concentration of at least 25 weight percent is preferred, the upper limit again being determined by solubility and other practical considerations.

Step 2 provides for regulating the concentration of sulfite (i.e. $SO_3^=$ and/or $HSO_3^-$) in the recirculating aqueous solution so that it is always less than 5 percent by weight thereof. Such regulation ensures efficient absorption of $SO_2$ and minimum risk of sulfate formation in the scrubbing circuit.

Step 3 recites the conversion of sulfite formed in the scrubbing zone to the corresponding thiosulfate, the same thiosulfate described in step 1. This conversion to thiosulfate is conducted in the scrubbing circuit while the recirculating solution is outside of the scrubbing zone itself. In other words, between the time the spent absorbent solution leaves the scrubbing zone and re-enters same, a major portion of the sulfite made in the pass through the scrubbing zone is converted to thiosulfate. Not all need be so converted, since it is desirable to have a small amount always present in the scrubbing circuit to reduce risk of $H_2S$ formation. The conversion is effected by reduction with a sulfite-reducing agent. The sulfite-reducing agent may be MHS, $M_2S$, or $M_2S_x$ (where $x$ is 2 to 5 inclusive) or any mixture thereof, along, sometimes, with minor amounts of elemental S, where M is alkali metal or $NH_4$. The term "sulfide" as used herein and in the claims means any one of MHS, $M_2S$ and $M_2S_x$, or mixtures thereof. Suitable thiosulfate-forming conditions include a pH between 6 and 8, preferably between 6.7 and 7.8; a temperature between 120° and 180°F.; and a residence time generally not more than 5 minutes.

In step 4, a minor portion of the recirculating aqueous solution is withdrawn from the scrubbing circuit to a regeneration zone. By "a minor portion" is meant less than 50 percent by volume, but preferably less than 10 percent. The precise amount withdrawn is determined by the thiosulfate concentration in the recirculating agueous solution, the higher the concentration, the smaller the portion that needs to be withdrawn, which is another reason for maintaining the thiosulfate concentration in the recirculating solution above 25 weight percent. The withdrawn portion, sometimes called a slip stream, is treated with CO, alone or in admixture with other gases, to yield a mixture of carbonate and sulfide in amounts sufficient to provide the required carbonate for absorption of $SO_2$ in the scrubbing zone and the required sulfide for conversion of sulfite to thiosulfate in the sulfite reduction zone. The general conditions in the regeneration zone are as follows:

Temperature - 300° to 600°F.
Pressure - 10 to 100 atms.

By suitable adjustment of temperature, pressure and CO input, the ratio of mols of CO consumed to mols of thiosulfate converted may be regulated between about 2 and 4. If it is desired to reject the net sulfur input, which is mostly in the form of $SO_2$, from the system in the form of $H_2S$, then a ratio of close to, but less than, 4 mols of CO consumed to mols of thiosulfate converted is selected since it favors the production of $H_2S$. As the ratio drops and approaches 2, there is an increasing production of polysulfides, i.e. $M_2S_x$ and, finally, of free elemental sulfur.

Finally, step 5 provides for the return of the effluent stream containing the required amounts of carbonate and sulfide to the scrubbing circuit, and specifically, to the sulfite-reduction zone so that the sulfide may react with the sulfite to produce thiosulfate before re-entry of the recirculating aqueous absorbent stream into the scrubbing zone. The carbonate so introduced is not affected, and is thereafter conducted to the scrubbing zone to pick up the $SO_2$.

The improved process of the present invention, in its preferred embodiment, may be advantageously applied to the treatment of flue gases resulting from the combustion of sulfur-containing carbonaceous fuels. Such flue gases contain principally nitrogen with relatively minor amounts of $CO_2$, $O_2$, and $SO_2$.

Our improved process, so applied, comprises the following steps:

1. passing said flue gas through a gas scrubbing zone which is maintained at a temperature between about 120° and 180°F.;

2. recirculating an aqueous solution through a circuit which includes the gas scrubbing zone in intimate contact with the flue gas to substantially absorb the $SO_2$, the aqueous solution containing sodium, potassium or ammonium carbonate in at least sufficient amount to react with all the $SO_2$ in the flue gas to form the corresponding sulfite ($SO_3^=$ and/or $HSO_3^-$), the concentration of the carbonate being less than 5 weight percent;

3. maintaining, in the recirculating aqueous solution throughout its entire traverse around the circuit, a thiosulfate having the same cation as the carbonate and having a concentration of at least ten percent by weight of the aqueous solution, and preferably at least 25 percent by weight;

4. regulating the amount of sulfite in the recirculating aqueous solution so that its concentration is always less than 5 percent by weight thereof;

5. maintaining the pH of the recirculating aqueous solution leaving the scrubbing zone between 6.0 and 7.8 (this may be done simply by regulating the amount of carbonate fed into the recirculating solution, in excess of that required to react with the $SO_2$);

6. treating the recirculating aqueous solution after it leaves the scrubbing zone in its traverse around the circuit in a sulfite reduction zone which is separate from the scrubbing zone with a sulfide at a temperature between 120° and 180°F. and a pH between 6.3 and 8, to effect conversion of sulfite to thiosulfate and to achieve substantially complete consumption of the sulfide;

7. withdrawing a portion of the recirculating aqueous solution which is less than 10 volume percent of the recirculating solution and conducting it to a regeneration zone;

8. reacting a gas containing CO as the essential reductant with the thiosulfate contained in the withdrawn portion under conditions to yield $H_2S$, alone or in admixture with elemental S, and an aqueous effluent product containing in admixture carbonate, bicarbonate, hydrosulfide and polysulfide, the temperature of the regeneration zone being between about 300° and 600°F., and the pressure being between 10 and 100 atmospheres;

9. regulating the volume of the withdrawn portion to provide sufficient thiosulfate for the production of the requisite quantities of carbonate and sulfide; and 10. returning the aqueous effluent product from the regeneration zone to the circuit to provide both the requisite carbonate for step 2 and the requisite sulfide for step 6.

SPECIFIC PREFERRED EMBODIMENT

The schematic flowsheet submitted herewith represents a specific preferred embodiment of the improved process of this invention. The sulfite-forming agent which is preferred for use in the scrubbing zone is potassium carbonate, $K_2CO_3$, because of the high solubility of potassium thiosulfate, $K_2S_2O_3$, in water. Actually, the carbonate will be a mixture of carbonate and bicarbonate as is true of any of the carbonates used in our improved process. The relative proportions of bicarbonate and carbonate are determined principally by the conditions maintained in the regeneration zone, later described.

Referring to the drawing, a flue gas is introduced into the bottom of the absorber or scrubber tower 10 through an inlet gas line 12. The composition of a typical flue gas from a coal-fired power station using coal with a sulfur content of 2.46 weight percent of the moisture-free coal is as follows, in volume percent: 74.63% $N_2$; 13.98% $CO_2$; 3.30% $O_2$; 0.17% $SO_2$; and 7.92% $H_2O$. The scrubber 10 may be, for example, a conventional countercurrent or concurrent packed tower, spray tower, or other conventional scrubbing apparatus, but the conventional countercurrent packed tower is preferred. Aqueous absorbent containing the carbonate and the thiosulfate is continuously fed through a conduit 14 into the top of the tower 10.

A typical composition of absorbent fed through conduit 14 during normal operation of the recirculatory system in accordance with our invention is as follows: $K_2S_2O_3$- 50 percent by weight; $K_2CO_3$ and $KHCO_3$- 0.5 percent by weight; KOOCH- 5 percent by weight; sulfites expressed as $KHSO_3$- approximately 1.5 percent by weight; and $K_2SO_4$ - 1 percent by weight, with the balance water. The presence of potassium formate (KOOCH) will be explained later. The flue gas is passed upwardly in countercurrent flow to the aqueous absorbent which enters the top of the tower. The temperature within the tower is maintained in this specific embodiment by way of example only, by any suitable means, at about 135°F. The principal reactions occurring in the scrubber may be expressed by the following equations:

1a. $K_2CO_3 + SO_2 = K_2SO_3 + CO_2$
1b. $K_2SO_3 + SO_2 + H_2O = 2\ KHSO_3$
1c. $K_2CO_3 + 2\ SO_2 + H_2O = 2\ KHSO_3 + CO_2$
1d. $KHCO_3 + SO_2 = KHSO_3 + CO_2$
1e. $2\ KHCO_3 + SO_2 = K_2SO_3 + 2\ CO_2 + H_2O$

The pH is maintained at about 7 in the liquid stream leaving the tower through line 18 by control of carbonate concentration. The liquid entering the tower through line 14 generally will be from 0.2 to 0.8 units higher in pH depending on the liquid circulation rate. In no case should the pH in line 14 exceed a value of about 8.

The range of liquid circulation rates through line 18 is suitably between 2 and 15 gallon/1000 CF, e.g. 10 gallon/1000 CF of gas entering the tower through line 12. No reaction between the $SO_2$ and the thiosulfate was ever observed under these conditions, nor for that matter, between the oxygen of the flue gas and the thiosulfate.

The effluent stream leaving the bottom of the scrubber contains very little unreacted $K_2CO_3$ or $KHCO_3$, as these are converted to sulfites. The sulfite is, in reality, a mixture of $K_2SO_3$ and $KHSO_3$. The proportions of the sulfite to bisulfite increases with pH. At a pH of 7.0, the molar ratio of bisulfite to sulfite is approximately one. The $K_2S_2O_3$ concentration remains essentially unchanged from that of the feed absorbent, as does that of the formate. Thus, the carbonate concentration has dropped close to zero, while the sulfite concentration expressed as weight percent equivalent $KHSO_3$ has increased to 2.0 weight percent. There is a small amount of sulfate in the effluent absorbent, e.g. about one percent or less of the sulfur absorbed, a significant improvement over the 5 to 10 percent generally found in such systems.

The efficiency of absorption of $SO_2$ and composition of the scrubbing product is dictated by the feed rate and composition of the regenerated solution entering the scrubber system through conduit 36. The solution contains principally KSH along with other potassium sulfides and potassium polysulfides which react rapidly in the thiosulfate generator 32 with the bisulfite in the recirculated scrubber solution which enters through conduit 30. The reaction in the case of KSH is:

2. $2\ KHSO_3 + KSH = 3/2\ K_2S_2O_3 + 3/2\ H_2O$

This reaction occurs rapidly at the same or slightly higher temperature than that used in the scrubbing tower. In accordance with our preferred mode of operation, a sufficient residence time is provided in the thiosulfate generator 32 to provide for complete consumption of the KSH feed. This is essential to avoid evolution of $H_2S$ into the treated stack gas, and is assured by maintaining a small excess of $KHSO_3$ that is more than enough to react with the KHS. The reaction rate decreases with increasing pH and, for this reason, the operating pH should be maintained below 8 in the thiosulfate generator 32. A residence time of 0.2 – 5 minutes is usually sufficient to provide for complete consumption of KSH in the thiosulfate generator 32 when the pH is in the preferred range of 6.7–7.8, e.g. 7.5.

Efficient absorption of $SO_2$ in the scrubber 10 is obtained if the feedrate of $K_2CO_3$ through line 36 is greater than ½ mol/mol $SO_2$ fed through line 12. However, the feedrate of $K_2CO_3$ should be less than 1 mol/mol $SO_2$ fed since, if it does, the pH in the entering solution in line 14 will exceed the maximum prescribed value of 8.

Similarly, the mol ratio of KSH to $K_2CO_3$ in the feed solution in line 36 should not exceed the maximum value of 1.0 and should be below this value to provide for the presence of $KHSO_3$ in the effluent from the $K_2S_2O_3$ generator 32. On the other hand, the molar ratio of KSH to $K_2CO_3$ must not be too low, for in this case, the sulfite concentration will build up to an unacceptably high value with resultant formation of undesirable sulfate. Suitably, the molar ratio of KSH to $K_2CO_3$ should be in the range of about 0.75 to 0.98 in the feed solution entering through conduit 36.

The solution entering through conduit 36 will generally contain the salts $KHCO_3$, $K_2S_x$ and small amounts of $K_2S$, in addition to $K_2CO_3$ and KSH. These materials react similarly and the feed relationships may be more broadly defined as follows:

Efficient absorption of $SO_2$ while maintaining the desired pH requires that, in the feed solution in conduit 36, the ratio $$\frac{2 \times \text{Moles } K_2CO_3 + \text{Moles } KHCO_3}{\text{Mols } SO_2}$$

should be greater than one, but less than two. Similarly, adequate conversion of the absorbed $SO_2$ to $K_2S_2O_3$ via sulfite reduction without evolution of $H_2S$ into the treated flue gas requires that the carbonates and sulfides in the feed solution in conduit 36 have the ratio, sometimes called the "acceptability" ratio, which is defined as follows:

$$R = \frac{2(S^0) + 3(S^{-2})}{\Sigma (K)}$$

The terms are defined as follows:
- $(S^0)$ = gm atoms sulfur with valence number zero/100 gms solution.
- $(S^{-2})$ = gm atoms sulfur with valence number equal to $-2$/100 gm solution.
- $\Sigma K$ = gm atoms of K/100 gms solution present in scrubber system feed solution as KHS, $K_2S$, $K_2S_x$, $K_2CO_3$, $KHCO_3$, KOH, $K_2SO_3$, $KHSO_3$. K present in other compounds such as $K_2SO_4$, KOOCH and $K_2S_2O_3$ is excluded.

The acceptability ratio must be no greater than one and is preferably within the range of 0.75 to 0.98. In defining the acceptability ratio, the potassium fed to the scrubber system as KOH and/or $K_2CO_3$ to make up for potassium loss from the system as $K_2SO_4$ is included.

The effluent or spent absorbent is pumped by a pump 20 through a conduit 22 to a point where a slip stream, e.g. 1 lb./130 lbs. of the main recirculating stream, is withdrawn by a conduit 24 through a filter 26 and thence to a $K_2CO_3$ generator 28 while the main stream is conducted by a conduit 30 to a $K_2S_2O_3$ generator 32. The primary purpose of the filter is to remove any accumulation of $K_2SO_4$ precipitate and any residual fly ash, and may be suitably placed anywhere in the system.

The $K_2CO_3$/KSH generator is a vessel in which the reaction of the spent absorbent, comprising principally $K_2S_2O_3$, with a reducing gas containing CO as the principal reductant, is conducted to convert the thiosulfate to carbonate and sulfide at 300°–600°F., e.g. 450°F. and 10–100 atmospheres, e.g. 500 psi. The input of gas and the input of liquid feed are controlled to provide a mol ratio of CO consumed to $K_2S_2O_3$ converted at a value approaching, but no greater than 4 to 1.

The reducing agent used usually consists of a mixture of carbon monoxide, carbon dioxide and hydrogen since such a mixture is readily obtainable by partial combustion of hydrocarbonaceous fuel. The reaction is preferably carried out in the absence of a catalyst in which case the essential reducing agent is carbon monoxide since hydrogen is relatively inert under noncatalytic conditions. Reduction of the $K_2S_2O_3$ in this fashion produces the desired carbonates and sulfides in accordance with the following simplified reactions.

3. $K_2S_2O_3 + 4 CO + 2 H_2O = K_2CO_3 + 2 H_2S + 3 CO_2$
4. $K_2S_2O_3 + 4 CO + 3 H_2O = 2 KHCO_3 + 2 H_2S + 2 CO_2$
5. $K_2S_2O_3 + 4 CO + H_2O = 2 KSH + 4 CO_2$

In addition to the foregoing products, some potassium formate is produced according to the following reactions:

6. $K_2CO_3 + 2 CO + H_2O = 2 KOOCH + CO_2$
7. $KHCO_3 + CO = KOOCH + CO_2$

The presence of any elemental S in the product mixture may be explained by the following reaction:

8. $3 K_2S_2O_3 + 8 CO + H_2O = 2 KSH + 2 K_2CO_3 + 4 S + 6 CO_2$

The amount of KOOCH formed reaches an equilibrium value which may be controlled, for example, by effecting incomplete conversion of the thiosulfate, i.e. between about 95 percent and just short of 100 percent. The equilibrium concentration of formate increases sharply as the thiosulfate conversion approaches 100 percent, to reach very high values in the regenerator effluent. We have found it desirable to maintain the concentration of formate in the regenerator effluent below 30 weight percent. High concentrations of formate, i.e. above about 30 weight percent, cause a substantial increase in sulfate formation and are thus undesirable. Otherwise, the formate seems to be inert so long as carbonate is present in the scrubber under the defined conditions. Concentrations of formate below 30 weight percent are useful since the presence of formate substantially decreases the water vapor present over the scrubbing solution.

The aqueous effluent product from the $K_2CO_3 + KSH$ regenerator 28 is a solution of $K_2CO_3$-$KHCO_3$ and KSH, $K_2S$, $K_2S_x$ in water and contains, in addition, KOOCH. It is withdrawn through conduit 36. The water content should generally be somewhat greater than the minimum required to hold the salts in solution to prevent the steam pressure from building up to too high a value in the regenerator 28. Generally, the water content of the product solution will be in the range of 30 to 60 weight percent. The sulfide and carbonate content is adjusted to meet the requirements set forth previously in the acceptability ratio for the feed solution through line 36.

The desired acceptability ratio may be achieved by proper selection of conditions in the regeneration step.

Under normal operating conditions in the regenerator, the acceptability ratio of the product tends to be high, i.e. it contains too much sulfide sulfur. Several expedients may be used to reduce the ratio. Carbon dioxide may be added to the feed reducing gas; a regenerator configuration may be used which provides for countercurrent flow between the reducing gas and the salt solution, and finally, reduction in operating pressure and temperature tends to reduce the acceptability ratio. Of course, where the ratio is too low, it may be increased by reversal of the above procedures.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a regenerative process for the removal of $SO_2$ from an $SO_2$-containing gas stream which has (1) a scrubbing circuit containing a scrubbing zone through which a recirculating stream of aqueous sodium, potassium or ammonium carbonate solution continuously passes in intimate contact with said gas stream under sulfite-forming conditions to thereby convert the $SO_2$ in the gas stream to sulfite, and (2) a regeneration zone for regenerating said carbonate for reuse in said scrubbing zone, the improvement which comprises
    a. maintaining in said recirculating aqueous solution, throughout its entire traverse around said scrubbing circuit, a thiosulfate having the same cation as said carbonate and in a concentration of at least 10 percent by weight of said recirculating solution;
    regulating the amount of sulfite in said recirculating aqueous solution so that its concentration is always less than 5 percent by weight thereof;
    c. converting the sulfite formed in said scrubbing zone to thiosulfate while in said scrubbing circuit, but in a sulfite-reduction zone separate from said scrubbing zone, by means of a sulfite-reducing agent;
    d. withdrawing a minor portion of said recirculating aqueous solution from said scrubbing circuit to a regeneration zone wherein thiosulfate contained in said minor portion is converted by means of CO to a mixture of carbonate and said sulfite-reducing agent; and
    e. returning an effluent aqueous stream containing in admixture said carbonate and said reducing agent to said scrubbing circuit.

2. A process according to claim 1 wherein said carbonate is potassium carbonate and said sulfite-reducing agent is potassium sulfide.

3. A process for removing $SO_2$ from a flue gas containing the same which comprises
    a. passing said flue gas through a gas scrubbing zone which is maintained at a temperature between about 120° and 180°F.;
    b. recirculating an aqueous solution through a circuit including said gas scrubbing zone, in intimate contact with said flue gas, said aqueous solution containing sodium, potassium or ammonium carbonate in at least sufficient amount to react with all the $SO_2$ in the flue gas;
    c. maintaining in said recirculating aqueous solution, throughout its entire traverse around said circuit, a thiosulfate having the same cation as said carbonate and having a concentration of at least 10 percent by weight of said aqueous solution;
    d. regulating the amount of sulfite in said recirculating aqueous solution so that its concentration is always less than 5 percent by weight thereof;
    e. maintaining the pH of said recirculating aqueous solution leaving said scrubbing zone between 6 and 7.8;
    f. treating said recirculating aqueous solution after it leaves said scrubbing zone in its traverse around said circuit in a sulfite reduction zone which is separate from said scrubbing zone with a sulfide at reducing conditions to effect conversion of said sulfite to thiosulfate and substantially complete consumption of said sulfide;
    g. withdrawing a portion of said recirculating aqueous solution which is less than ten volume percent of said recirculating solution and conducting said portion to a regeneration zone;
    h. reacting a gas containing CO as the essential reductant in a regeneration zone with the thiosulfate contained in said withdrawn portion of said recirculating aqueous solution to yield an aqueous effluent product containing in admixture said carbonate and said sulfide;
    i. regulating the volume of said withdrawn portion to provide sufficient thiosulfate for the production of the requisite quantities of said carbonate and said sulfide; and
    j. returning said aqueous effluent product from said regeneration zone to said circuit to provide both the requisite carbonate for step (b) and the sulfide for step (f).

4. A process according to claim 3 wherein the carbonate is potassium carbonate.

5. A process according to claim 4 wherein the concentration of the potassium carbonate in the aqueous solution entering the scrubbing zone is less than 5 weight percent and that of the thiosulfate is at least 25 weight percent.

6. A process according to claim 5 wherein the pH of the sulfite-reduction zone is maintained between 6.3 and 8 and the sulfide is substantially completely consumed before re-entry of the recirculating absorbent solution into the scrubbing zone.

7. A process according to claim 6 wherein the reaction of the CO with thiosulfate in the regeneration zone is conducted at a temperature between 300° and 600°F. and at a pressure between 10 and 100 atmospheres.

8. A process according to claim 7 wherein said aqueous effluent which is returned to said circuit in step (j) from the regeneration zone contains a mixture of sulfide and carbonate in the following ratio R, $$R = \frac{2(S^0) + 3(S^{-2})}{\Sigma(K)}$$

where:
R is no greater than 1.
$(S^0)$ = gram atoms sulfur with valence number zero/100 grams solution.
$(S^{-2})$ = gram atoms sulfur with valence number equal to $-2$/100 gram solution.
$\Sigma K$ = gram atoms of K/100 grams solution present in said aqueous effluent as $KHS$, $K_2S$, $K_2S_x$, $K_2CO_3$, $KHCO_3$, $KOH$, $K_2SO_3$, $KHSO_3$.

9. A process according to claim 8 wherein R is within the range of 0.75 to 0.98.

10. A process according to claim 9 wherein a stream of gas comprising CO and $CO_2$ is fed into said regeneration zone, the $CO_2$ content thereof being sufficient to maintain the value of R within said range of 0.75 to 0.98.

11. A process according to claim 10 wherein a stream of gas containing gaseous $H_2S$ is removed from said regeneration zone.

* * * * *